(12) United States Patent
Ozawa et al.

(10) Patent No.: US 10,510,370 B2
(45) Date of Patent: *Dec. 17, 2019

(54) MAGNETIC TAPE INCLUDING CHARACTERIZED MAGNETIC LAYER AND MAGNETIC TAPE DEVICE

(71) Applicant: FUJIFILM Corporation, Tokyo (JP)

(72) Inventors: Eiki Ozawa, Minami-ashigara (JP); Tetsuya Kaneko, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,832

(22) Filed: Jun. 19, 2017

(65) Prior Publication Data

US 2017/0372744 A1     Dec. 28, 2017

(30) Foreign Application Priority Data

Jun. 23, 2016  (JP) .................................. 2016-124942

(51) Int. Cl.
  *G11B 5/70*   (2006.01)
  *G11B 5/78*   (2006.01)
  (Continued)

(52) U.S. Cl.
  CPC ............... *G11B 5/78* (2013.01); *G11B 5/584* (2013.01); *G11B 5/70* (2013.01); *G11B 5/708* (2013.01); *G11B 5/71* (2013.01); *G11B 5/7305* (2013.01)

(58) Field of Classification Search
  None
  See application file for complete search history.

(56) References Cited

U.S. PATENT DOCUMENTS 3,966,686 A   6/1976   Asakura et al.
4,112,187 A   9/1978   Asakura et al.
(Continued)

FOREIGN PATENT DOCUMENTS

DE   101 46 429 A1   3/2002
GB       2495356 A   4/2013
(Continued)

OTHER PUBLICATIONS

Communication dated Dec. 6, 2016 from the U.S. Patent and Trademark Office in U.S. Appl. No. 14/757,555.
(Continued)

*Primary Examiner* — Kevin M Bernatz
(74) *Attorney, Agent, or Firm* — Sughrue Mion, PLLC

(57) ABSTRACT

A magnetic tape is provided in which the total thickness of a non-magnetic layer and a magnetic layer is equal to or smaller than 0.60 μm. The magnetic layer includes a timing-based servo pattern and also includes fatty acid ester. The full width at half maximum of spacing distribution measured by optical interferometry regarding the surface of the magnetic layer before performing vacuum heating with respect to the magnetic tape is greater than 0 nm and less than or equal to 7.0 nm, while the same value measured after performing the vacuum heating is also greater than 0 nm and less than or equal to 7.0 nm. Further, the difference between a spacing measured after performing the vacuum heating and a spacing measured before performing the vacuum heating is greater than 0 nm and equal to or smaller than 8.0 nm.

18 Claims, 2 Drawing Sheets

(51) Int. Cl.
G11B 5/584 (2006.01)
G11B 5/708 (2006.01)
G11B 5/71 (2006.01)
G11B 5/73 (2006.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 9/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,689,384 A | 11/1997 | Albrecht et al. | |
| 5,728,454 A | 3/1998 | Inaba et al. | |
| 5,786,074 A | 6/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 * | 3/2001 | Shimomura | G11B 5/70 428/141 |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,279,739 B2 | 10/2012 | Kanbe et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 * | 12/2017 | Ozawa | G11B 5/00813 |
| 9,959,894 B2 | 5/2018 | Omura | |
| 9,972,351 B2 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 | 11/2018 | Kasada et al. | |
| 10,170,144 B2 * | 1/2019 | Ozawa | G11B 5/70 |
| 10,347,279 B2 * | 7/2019 | Ozawa | G11B 5/70 |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 * | 2/2012 | Tanaka | G11B 5/71 428/840.2 |
| 2012/0152891 A1 | 6/2012 | Brown et al. | |
| 2012/0177951 A1 | 7/2012 | Yamazaki et al. | |

(56) References Cited

U.S. PATENT DOCUMENTS

| | | |
|---|---|---|
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1* | 10/2013 | Cideciyan ............ H03M 13/13 360/53 |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1* | 3/2017 | Ozawa .................... G11B 5/70 |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi .................. G11B 5/66 |
| 2017/0221517 A1* | 8/2017 | Ozawa .................... G11B 5/66 |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1* | 12/2017 | Ozawa .................... G11B 5/78 |
| 2017/0372740 A1* | 12/2017 | Ozawa .................... G11B 5/78 |
| 2017/0372741 A1* | 12/2017 | Kurokawa ............... G11B 5/78 |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1* | 8/2018 | Ozawa ............... G11B 5/00813 |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1* | 10/2018 | Ozawa .................. G11B 5/3909 |
| 2018/0286442 A1* | 10/2018 | Ozawa ............... G11B 5/70615 |
| 2018/0286443 A1* | 10/2018 | Ozawa ............... G11B 5/70615 |
| 2018/0286444 A1 | 10/2018 | Kasada et al. |
| 2018/0286446 A1* | 10/2018 | Ozawa .................... G11B 5/712 |
| 2018/0286447 A1 | 10/2018 | Ozawa et al. |
| 2018/0286448 A1* | 10/2018 | Ozawa .................... G11B 5/714 |
| 2018/0286449 A1 | 10/2018 | Kasada et al. |
| 2018/0286450 A1 | 10/2018 | Kasada et al. |
| 2018/0286451 A1* | 10/2018 | Ozawa ..................... G11B 5/70 |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1* | 1/2019 | Ozawa .................... G11B 5/735 |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1* | 3/2019 | Ozawa ..................... G11B 5/70 |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295590 A1 | 9/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63249932 A | 10/1988 |
| JP | 64-57422 A | 3/1989 |
| JP | 6460819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |

(56) References Cited

FOREIGN PATENT DOCUMENTS

| JP | 2002-157726 A | 5/2002 |
|---|---|---|
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-114492 A | 4/2004 |
| JP | 2004-133997 A | 4/2004 |
| JP | 2004-185676 A | 7/2004 |
| JP | 2005-38579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2008-047276 A | 2/2008 |
| JP | 2008-243317 A | 10/2008 |
| JP | 2009-283082 A | 12/2009 |
| JP | 2010-036350 A | 2/2010 |
| JP | 2010-049731 A | 3/2010 |
| JP | 2011-048878 A | 3/2011 |
| JP | 2011-138566 A | 7/2011 |
| JP | 2011-210288 A | 10/2011 |
| JP | 2011-225417 A | 11/2011 |
| JP | 2012-038367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-71926 A | 5/2016 |
| JP | 2016-139451 A | 8/2016 |

OTHER PUBLICATIONS

Communication dated Dec. 5, 2016 from the U.S. Patent and Trademark Office in U.S. Appl. No. 14/978,834.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 15/422,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
An Office Action dated May 4, 2018, which issued during the prosecution of U.S. Appl. No. 15/422,821.
An Office Action dated May 4, 2018, which issued during the prosecution of U.S. Appl. No. 15/625,428.
An Office Action dated May 4, 2018, which issued during the prosecution of U.S. Appl. No. 15/422,944.
An Office Action dated May 7, 2018, which issued during the prosecution of U.S. Appl. No. 15/624,897.
An Office Action dated May 7, 2018, which issued during the prosecution of U.S. Appl. No. 15/624,792.
An Office Action dated May 2, 2018, which issued during the prosecution of U.S. Appl. No. 15/280,195.
Notice of Allowance dated Aug. 30, 2017, which issued during the prosecution of U.S. Appl. No. 15/466,143.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Office Action dated Oct. 3, 2018, which issued during the prosecution of U.S. Appl. No. 15/280,195.
Office Action dated Jul. 6, 2018, which issued during the prosecution of U.S. Appl. No. 15/848,173.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/380,336.
Office Action dated Oct. 15, 2018, which issued during the prosecution of U.S. Appl. No. 15/619,012.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 3, 2018, which issued during the prosecution of U.S. Appl. No. 15/388,911.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Notice of Allowance dated Dec. 2, 2016 which issued during the prosecution of U.S. Appl. No. 14/753,227.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
Office Action dated Feb. 4, 2016 which issued during the prosecution of U.S. Appl. No. 14/753,227.
Notice of Allowance dated Jul. 12, 2017 which issued during the prosecution of U.S. Appl. No. 15/388,864.
Office Action dated Jun. 9, 2017 which issued during the prosecution of U.S. Appl. No. 15/388,864.
Office Action dated Apr. 26, 2017 which issued during the prosecution of U.S. Appl. No. 15/388,864.
Office Action dated Jun. 7, 2018 which issued during the prosecution of U.S. Appl. No. 15/380,309.
Office Action dated May 30, 2018 which issued during the prosecution of U.S. Appl. No. 15/388,911.

(56) References Cited

OTHER PUBLICATIONS

Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
U.S. Appl. No. 15/241,286, Patented as U.S. Pat. No. 10,026,433.
U.S. Appl. No. 15/920,768, Allowed; RCE filed.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
U.S. Appl. No. 15/422,944, Allowed; RCE filed Nov. 21, 2018.
U.S. Appl. No. 15/625,428, Allowed Dec. 4, 2018.
U.S. Appl. No. 15/626,720, Pending.
U.S. Appl. No. 15/848,173, Pending.
U.S. Appl. No. 15/854,438, Allowed, Issue Fee not yet paid.
U.S. Appl. No. 15/920,563, Petition to Withdraw from Issue and RCE filed Dec. 17, 2018.
U.S. Appl. No. 15/854,438, Allowed; RCE filed.
U.S. Appl. No. 15/920,563, Petition to Withdraw from Issue and RCE filed.
U.S. Appl. No. 15/920,768, QPIDS filed Dec. 10, 2018.
U.S. Appl. No. 16/009,603, Pending.
U.S. Appl. No. 15/625,428, Pending.
U.S. Appl. No. 15/422,821, Pending.
U.S. Appl. No. 15/422,944, Allowed.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/625,428, Allowed Dec. 4, 2018; RCE Filed.
U.S. Appl. No. 15/380,336, Allowed; RCE filed Nov. 21, 2018.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.

(56) References Cited

OTHER PUBLICATIONS

U.S. Appl. No. 15/854,439, Pending.
U.S. Appl. No. 15/848,173, Allowed.
U.S. Appl. No. 15/628,814, Pending.
U.S. Appl. No. 15/626,355, Pending.
U.S. Appl. No. 15/380,309, Pending.
U.S. Appl. No. 15/854,438, Allowed.
U.S. Appl. No. 15/854,409, Allowed.
U.S. Appl. No. 15/920,563, Allowed.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
U.S. Appl. No. 15/920,518, Allowed; RCE filed.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 16/100,289, Pending.
U.S. Appl. No. 15/900,106, Pending.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
"Introduction to TMR Magnetic Sensors", Anonymous, Mar. 12, 2015, MR Sensor Technology, pp. 1-4 (Year: 2015).
Notice of Allowance dated Mar. 5, 2019 in U.S. Appl. No. 16/009,603.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,897.
Office Action dated Feb. 26, 2019 in U.S. Appl. No. 15/624,792.
Office Action dated Feb. 28, 2019 in U.S. Appl. No. 15/920,518.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Office Action dated Feb. 21, 2019 in U.S. Appl. No. 15/854,383.
Office Action dated Dec. 21, 2018 in U.S. Appl. No. 15/920,616.
Office Action dated Dec. 20, 2018 in U.S. Appl. No. 15/900,242.
Office Action dated Dec. 27, 2018 in U.S. Appl. No. 15/900,334.
Office Action dated Dec. 7, 2019 in U.S. Appl. No. 15/920,592.
Notice of Allowance dated Aug. 27, 2018 in U.S. Appl. No. 15/920,635.
U.S. Appl. No. 15/280,195, Pending.
U.S. Appl. No. 15/422,821, Allowed.
U.S. Appl. No. 15/619,012, Pending.
U.S. Appl. No. 15/624,897, Pending.
U.S. Appl. No. 15/624,792, Pending.
U.S. Appl. No. 15/625,428, Allowed.
U.S. Appl. No. 15/380,336, Pending.
U.S. Appl. No. 15/614,876, Allowed.
U.S. Appl. No. 15/621,464, Allowed.
U.S. Appl. No. 15/854,383, Allowed.
U.S. Appl. No. 15/848,173, Allowed; QPIDS filed.
U.S. Appl. No. 15/628,814, Allowed; RCE filed.
U.S. Appl. No. 15/690,400, Pending.
U.S. Appl. No. 15/690,906, Pending.
U.S. Appl. No. 15/626,355, Allowed; RCE filed.
U.S. Appl. No. 15/627,696, Pending.
U.S. Appl. No. 15/388,911, Pending.
U.S. Appl. No. 15/380,309, Allowed.
U.S. Appl. No. 15/854,438, Allowed; QPIDS filed.
U.S. Appl. No. 15/854,409, Allowed; QPIDS filed.
U.S. Appl. No. 15/920,563, Allowed; QPIDS filed.
U.S. Appl. No. 15/920,533, Pending.
U.S. Appl. No. 15/900,230, Allowed.
U.S. Appl. No. 15/900,164, Allowed.
U.S. Appl. No. 15/920,518, Pending.
U.S. Appl. No. 15/899,430, Allowed.
U.S. Appl. No. 15/920,515, Allowed.

(56) References Cited

OTHER PUBLICATIONS

U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed; QPIDS filed.
U.S. Appl. No. 16/009,603, Allowed.
U.S. Appl. No. 16/182,083, Pending (Continuation of U.S. Appl. No. 15/920,768).
U.S. Appl. No. 16/232,165, Pending (Continuation of U.S. Appl. No. 15/854,438).
U.S. Appl. No. 16/100,289, Allowed; RCE filed.
U.S. Appl. No. 15/900,106, Allowed.
U.S. Appl. No. 15/900,412, Patented as U.S. Pat. No. 10,062,403.
U.S. Appl. No. 15/900,160, Allowed.
U.S. Appl. No. 15/900,345, Allowed.
U.S. Appl. No. 15/900,379, Allowed.
U.S. Appl. No. 15/920,616, Allowed.
U.S. Appl. No. 15/900,334, Allowed.
U.S. Appl. No. 15/920,592, Allowed.
U.S. Appl. No. 16/038,339, Allowed.
U.S. Appl. No. 16/044,574, Allowed.
Notice of Allowance dated Jul. 16, 2019 in U.S. Appl. No. 15/900,144.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated May 23, 2019 in U.S. Appl. No. 15/388,911.
Office Action dated Jul. 16, 2019 in Japanese Application No. 2016-124933.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Allowed.
U.S. Appl. No. 15/422,821, Allowed; QPIDS filed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Allowed.
U.S. Appl. No. 15/624,897, Allowed.
U.S. Appl. No. 15/624,792, Allowed.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed.
U.S. Appl. No. 15/614,876, Patented as U.S. Pat. No. 10,431,248.
U.S. Appl. No. 15/620,916, Allowed.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Pat. No. 9,959,894.
U.S. Appl. No. 15/388,911, Allowed.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,4331.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Allowed.
U.S. Appl. No. 15/900,080, Allowed.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Allowed.
U.S. Appl. No. 15/899,587, Pending.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083 Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,4032.
U.S. Appl. No. 15/900,141, Allowed.
U.S. Appl. No. 15/900,160, Patented as U.S. Pat. No. 10,438,625.
U.S. Appl. No. 15/900,345, Allowed; QPIDS filed.
U.S. Appl. No. 15/900,379, Patented as U.S. Pat. No. 10,453,488.
U.S. Appl. No. 16/012,018, Pending.
U.S. Appl. No. 15/920,616, Patented as U.S. Pat. No. 10,438,623.
U.S. Appl. No. 15/900,242, Allowed.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.

(56) References Cited

OTHER PUBLICATIONS

U.S. Appl. No. 16/044,574, Patented as U.S. Pat. No. 10,438,622.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
U.S. Appl. No. 15/854,397, Pending.
U.S. Appl. No. 15/854,329, Patented as U.S. Pat. No. 9,984,712.
U.S. Appl. No. 14/838,663, Abandoned.
Notice of Allowance dated Jul. 31, 2019 in U.S. Appl. No. 16/100,289.
Notice of Allowance dated Jul. 31, 2019 in U.S. Appl. No. 16/143,646.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Sep. 17, 2019 in Japanese Application No. 2017-029499.
Office Action dated Sep. 3, 2019 in Japanese Application No. 2016-254434.

* cited by examiner

MAGNETIC TAPE INCLUDING CHARACTERIZED MAGNETIC LAYER AND MAGNETIC TAPE DEVICE

CROSS-REFERENCE TO RELATED APPLICATIONS

This application claims priority under 35 U.S.C 119 to Japanese Patent Application No. 2016-124942 filed on Jun. 23, 2016. The above application is hereby expressly incorporated by reference, in its entirety.

BACKGROUND OF THE INVENTION

1. Field of the Invention

The present invention relates to a magnetic tape and a magnetic tape device.

2. Description of the Related Art

Magnetic recording media are divided into tape-shaped magnetic recording media and disk-shaped magnetic recording media, and tape-shaped magnetic recording media, that is, magnetic tapes (hereinafter, also simply referred to as "tapes") are mainly used for data storage such as data back-up or archive. The recording of information into magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technology of disposing the larger amount of data tracks in a width direction of the magnetic tape by narrowing the width of the data track to increase recording density is used.

However, when the width of the data track is narrowed and the recording and/or reproduction of magnetic signals is performed by allowing the running of the magnetic tape in a magnetic tape device (normally referred to as a "drive"), it is difficult that a magnetic head correctly follows the data tracks in accordance with the position change of the magnetic tape in the width direction, and errors may easily occur at the time of recording and/or reproduction. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo pattern is formed in a magnetic layer of a magnetic tape, and this servo pattern is magnetically read to perform head tracking. More specific description is as follows.

First, a servo head reads a servo pattern formed in a magnetic layer (that is, reproduces a servo signal). A position of a magnetic head of the magnetic tape in a width direction is controlled in accordance with values (will be described later specifically) obtained by reading the servo pattern. Accordingly, when running the magnetic tape in the magnetic tape device for recording and/or reproducing a magnetic signal (information), it is possible to increase an accuracy of the position of the magnetic head following the data track, even when the position of the magnetic tape is changed in the width direction with respect to the magnetic head. By doing so, it is possible to correctly record information on the magnetic tape and/or correctly reproduce information recorded on the magnetic tape.

As the magnetic servo type servo system described above, a timing-based servo type system is widely used in recent years. In a timing-based servo type servo system (hereinafter, referred to as a "timing-based servo system"), a plurality of servo patterns having two or more different shapes are formed in a magnetic layer, and a position of a servo head is recognized by an interval of time when the servo head has read the two servo patterns having different shapes and an interval of time when the servo head has read two servo patterns having the same shapes. The position of the magnetic head of the magnetic tape in the width direction is controlled based on the position of the servo head recognized as described above.

Meanwhile, the magnetic tape is normally used to be accommodated and circulated in a magnetic tape cartridge. In order to increase recording capacity for 1 reel of the magnetic tape cartridge, it is desired to increase total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing the total thickness of a non-magnetic layer and a magnetic layer of a magnetic tape including the non-magnetic layer and the magnetic layer on a non-magnetic support in this order is used.

In consideration of these circumstances, the inventors have studied the application of a magnetic tape having a decreased total thickness of a non-magnetic layer and a magnetic layer to a timing-based servo system. However, in such studies, it was clear that, a phenomenon which was not known in the related art occurred, in which an output of a servo signal reproduced by a servo head is decreased compared to that in an initial running stage (hereinafter, also referred to as an "output decrease of a servo signal") occurs, when a head tracking is continuously performed while causing the magnetic tape to run in a timing-based servo system, in a magnetic tape having the total thickness of a non-magnetic layer and a magnetic layer equal to or smaller than 0.60 m. The output decrease of a servo signal causes a decrease in an accuracy of the position of the magnetic head following the data track in the timing-based servo system (hereinafter, referred to as a "head positioning accuracy"). Therefore, it is necessary that the output decrease of a servo signal is prevented, in order to more correctly record information to the magnetic tape and/or more correctly reproduce the information recorded in the magnetic tape by using the timing-based servo system.

Therefore, an object of the invention is to prevent an output decrease of a servo signal of a timing-based servo system, in a magnetic tape having the total thickness of a non-magnetic layer and a magnetic layer equal to or smaller than 0.60 m.

According to one aspect of the invention, there is provided a magnetic tape comprising: a non-magnetic support; a non-magnetic layer including non-magnetic powder and a binder on the non-magnetic support; and a magnetic layer including ferromagnetic powder and a binder on the non-magnetic layer, in which the total thickness of the non-magnetic layer and the magnetic layer is equal to or smaller than 0.60 μm, the magnetic layer includes a timing-based servo pattern, the magnetic layer includes fatty acid ester, a full width at half maximum of spacing distribution measured by optical interferometry regarding the surface of the magnetic layer before performing vacuum heating with respect to the magnetic tape (hereinafter, also referred to as "FWHM$_{before}$") is greater than 0 nm and equal to or smaller than 7.0 nm, a full width at half maximum of spacing distribution measured by optical interferometry regarding the surface of the magnetic layer after performing the vacuum heating with respect to the magnetic tape (hereinafter, also referred to as "FWHM$_{after}$") is greater than 0 nm and equal to or smaller than 7.0 nm, and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape (hereinafter, also simply referred to as a "difference ($S_{after}-S_{before}$)") is greater than 0 nm and equal to or smaller than 8.0 nm.

The "timing-based servo pattern" of the invention and the specification is a servo pattern with which the head tracking of the timing-based servo system can be performed. The timing-based servo system is as described above. The servo pattern with which the head tracking of the timing-based servo system can be performed, is formed in the magnetic layer by a servo pattern recording head (also referred to as a "servo write head") as a plurality of servo patterns having two or more different shapes. As an example, the plurality of servo patterns having two or more different shapes are continuously disposed at regular intervals for each of the plurality of servo patterns having the same shapes. As another example, different types of the servo patterns are alternately disposed. The same shapes of the servo patterns do not only mean the completely same shape, and a shape error occurring due to a device such as a servo write head or the like is allowed. The shapes of the servo pattern with which the head tracking of the timing-based servo system can be performed and the disposition thereof in the magnetic layer are well known and specific aspect thereof will be described later. Hereinafter, the timing-based servo pattern is also simply referred to as a servo pattern. In the specification, as heads, a "servo write head", a "servo head", and a "magnetic head" are disclosed. The servo write head is a head which performs recording of a servo signal as described above (that is, formation of a servo pattern). The servo head is a head which performs reproduction of the servo signal (that is, reading of the servo pattern), and the magnetic head is a head which performs recording and/or reproduction of information.

In the invention and the specification, the "vacuum heating" of the magnetic tape is performed by holding the magnetic tape in an environment of pressure of 200 Pa to 0.01 MPa and an atmosphere temperature of 70° C. to 90° C. for 24 hours.

In the invention and the specification, the spacing measured by optical interferometry regarding the surface of the magnetic layer of the magnetic tape is a value measured by the following method. In addition, in the invention and the specification, the "surface of the magnetic layer" of the magnetic tape is identical to the surface of the magnetic tape on the magnetic layer side.

In a state where the magnetic tape and a transparent plate-shaped member (for example, glass plate or the like) are overlapped on each other so that the surface of the magnetic layer of the magnetic tape faces the transparent plate-shaped member, a pressing member is pressed against the side of the magnetic tape opposite to the magnetic layer side at pressure of $5.05\times10^4$ N/m (0.5 atm). In this state, the surface of the magnetic layer of the magnetic tape is irradiated with light through the transparent plate-shaped member (irradiation region: 150,000 to 200,000 μm$^2$), and a spacing (distance) between the surface of the magnetic layer of the magnetic tape and the surface of the transparent plate-shaped member is acquired based on intensity (for example, contrast of interference fringe image) of interference light generated due to a difference in an optical path between reflected light from the surface of the magnetic layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be in a range of 500 to 700 nm, for example. However, the wavelength of light incident to the light reception unit is not limited to be in the range described above. In addition, the transparent plate-shaped member may be a member having transparency with which light emitted passes, to the extent that the magnetic tape is irradiated with light through this member and interference light is obtained.

The measurement described above can be performed by using a commercially available tape spacing analyzer (TSA) such as Tape Spacing Analyzer manufactured by MicroPhysics, Inc., for example. The spacing measurement of the Examples was performed by using Tape Spacing Analyzer manufactured by MicroPhysics, Inc.

In addition, the full width at half maximum of spacing distribution of the invention and the specification is a full width at half maximum (FWHM), when the interference fringe image obtained by the measurement of the spacing described above is divided into 300,000 points, a spacing of each point (distance between the surface of the magnetic layer of the magnetic tape and the surface of the transparent plate-shaped member on the magnetic tape side) is acquired, this spacing is shown with a histogram, and this histogram is fit with Gaussian distribution.

Further, the difference ($S_{after}-S_{before}$) is a value obtained by subtracting a mode before the vacuum heating from a mode after the vacuum heating of the 300,000 points.

In one aspect, the total thickness of the non-magnetic layer and the magnetic layer is 0.20 μm to 0.60 μm.

In one aspect, the difference ($S_{after}-S_{before}$) is greater than 0 nm and equal to or smaller than 7.0 nm.

In one aspect, the difference ($S_{after}-S_{before}$) is 2.0 nm to 7.0 nm.

In one aspect, the FWHM$_{before}$ is greater than 0 nm and equal to or smaller than 5.0 nm.

In one aspect, the FWHM$_{after}$ is greater than 0 nm and equal to or smaller than 5.0 nm.

In one aspect, the magnetic layer includes a non-magnetic filler. The non-magnetic filler is identical to the non-magnetic powder. In the invention and the specification, the non-magnetic powder means an aggregate of a plurality of non-magnetic particles. The aggregate not only includes an aspect in which particles configuring the aggregate directly come into contact with each other, but also includes an aspect in which a binder and an additive is interposed between the particles. A term "particles" is also used for describing the powder. The same applies to various powder forms of the invention and the specification such as the ferromagnetic powder and the like.

In one aspect, the non-magnetic filler is colloidal particles. In the invention and the specification, the "colloidal particles" are particles which are not precipitated and dispersed to generate a colloidal dispersion, when 1 g of the particles are added to 100 mL of at least one organic solvent of at least methyl ethyl ketone, cyclohexanone, toluene, or ethyl acetate, or a mixed solvent including two or more kinds of the solvents described above at an arbitrary mixing ratio.

In one aspect, the colloidal particles are silica colloidal particles.

According to another aspect of the invention, there is provided a magnetic tape device comprising: the magnetic tape described above; a magnetic head; and a servo head.

According to one aspect of the invention, it is possible to provide a magnetic tape in which the total thickness of a non-magnetic layer and a magnetic layer is equal to or smaller than 0.60 μm, a servo pattern is formed in a magnetic layer, and an output decrease of a servo signal of a timing-based servo system is prevented, and a magnetic tape device which records and/or reproduces a magnetic signal to the magnetic tape.

DESCRIPTION OF THE PREFERRED EMBODIMENTS

Magnetic Tape

According to one aspect of the invention, there is provided a magnetic tape including: a non-magnetic support; a non-magnetic layer including non-magnetic powder and a binder on the non-magnetic support; and a magnetic layer including ferromagnetic powder and a binder on the non-magnetic layer, in which the total thickness of the non-magnetic layer and the magnetic layer is equal to or smaller than 0.60 μm, the magnetic layer includes a timing-based servo pattern, the magnetic layer includes fatty acid ester, a full width at half maximum ($FWHM_{before}$) of spacing distribution measured by optical interferometry regarding the surface of the magnetic layer before performing vacuum heating with respect to the magnetic tape is greater than 0 nm and equal to or smaller than 7.0 nm, a full width at half maximum ($FWHM_{after}$) of spacing distribution measured by optical interferometry regarding the surface of the magnetic layer after performing the vacuum heating with respect to the magnetic tape is greater than 0 nm and equal to or smaller than 7.0 nm, and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

Hereinafter, the magnetic tape described above will be described more specifically. The following description contains surmise of the inventors. The invention is not limited by such surmise. In addition, hereinafter, the examples are described with reference to the drawings. However, the invention is not limited to such exemplified aspects.

Timing-Based Servo Pattern

The magnetic tape includes a timing-based servo pattern in the magnetic layer. The timing-based servo pattern is the servo pattern described above. In a magnetic tape used in a linear recording system which is widely used as a recording system of the magnetic tape device, for example, a plurality of regions (referred to as "servo bands") where servo patterns are formed are normally present in the magnetic layer along a longitudinal direction of the magnetic tape. A region interposed between two servo bands is referred to as a data band. The recording of magnetic signals (information) is performed on the data band and a plurality of data tracks are formed in each data band along the longitudinal direction.

Figure 1:
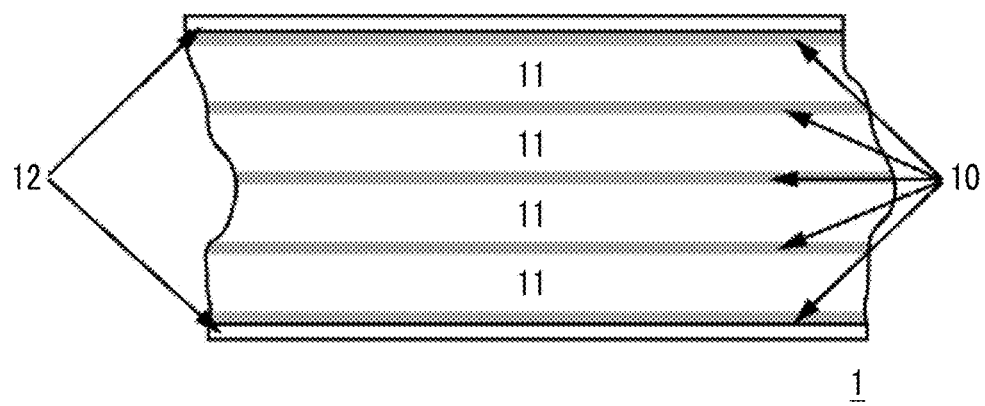
FIG. 1 shows an example of disposition of data bands and servo bands.
Figure 2:
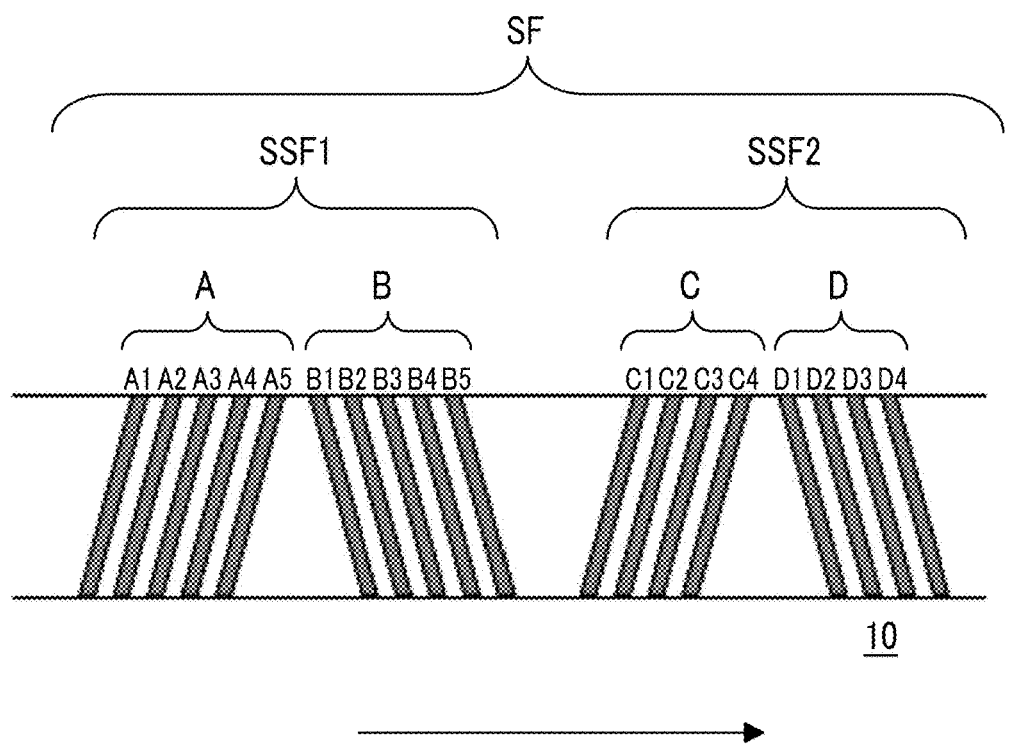
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in a LTO Ultrium format tape which is based on a local standard, a plurality of servo patterns tilted in a tape width direction as shown in FIG. 2 are formed on a servo band when manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for description. However, in practice, in a magnetic layer of the magnetic tape in which a head tracking is performed in a timing-based servo system, a plurality of servo frames are disposed in each servo band in a running direction. In FIG. 2, an arrow shows the running direction. For example, a LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the running magnetic tape.

In the timing-based servo system, a position of a servo head is recognized based on an interval of time when the servo head has read the two servo patterns (reproduced servo signals) having different shapes and an interval of time when the servo head has read two servo patterns having the same shapes. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time when the two servo patterns having different shapes are read by the servo head is, for example, an interval between the time when any servo pattern of the A burst is read and the time when any servo pattern of the B burst is read. An interval of the time when the two servo patterns having the same shapes are read by the servo head is, for example, an interval between the time when any servo pattern of the A burst is read and the time when any servo pattern of the C burst is read. The timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIG. 1 and FIG. 2, but also to entire timing-based servo systems. When recording and reproducing magnetic signals (information) by the magnetic head by causing the magnetic tape to run in the magnetic tape device using the timing-based servo system, a decrease in output of a servo signal while continuously reading the servo pattern (continuously reproducing the servo signal) by the servo head causes a decrease in a measurement accuracy of the time interval. As a result, while the running is continuously performed, a head positioning accuracy is decreased. In regards to this point, in the studies of the inventors, it was found that the output decrease of the servo signal significantly occurs in the magnetic tape having the total thickness of the non-magnetic layer and the magnetic layer equal to or smaller than 0.60 µm. The inventors have thought that a main reason of the output decrease of the servo signal is attached materials attached to a servo write head, while a plurality of servo patterns are sequentially formed in the magnetic layer while the servo write head comes into contact with and slide on the surface of the magnetic layer of the magnetic tape. The inventors have surmised that, as a result of deterioration of servo pattern forming ability of the servo write head due to the effect of the attached materials, a magnetic force of the servo pattern formed is gradually deteriorated, while the servo patterns are continuously formed. It is thought that in the magnetic layer having the servo patterns formed as described above, the output of a servo signal is decreased, while the servo patterns are continuously read by the servo head (servo signals are continuously reproduced). The inventors have surmised that, a reason of the occurrence of such a phenomenon in the magnetic tape having the total thickness of the non-magnetic layer and the magnetic layer equal to or smaller than 0.60 m may be a contact state between the servo write head and the surface of the magnetic layer of the magnetic tape which is different from that of the magnetic tape having the total thickness of the non-magnetic layer and the magnetic layer exceeding 0.60 m.

With respect to this, as a result of the intensive studies of the inventors, it was clear that the output decrease of the servo signal of the magnetic tape having the total thickness of the non-magnetic layer and the magnetic layer equal to or smaller than 0.60 µm can be prevented by setting the $FWHM_{before}$, $FWHM_{after}$, and the difference ($S_{after}-S_{before}$) to be in the ranges described above. The surmise of the inventors regarding this point will be described in the following (1) and (2).

(1) When forming a servo pattern on the magnetic layer by the servo write head, a projection existing on the surface of the magnetic layer normally comes into contact (so-called real contact) with the servo write head, however, a part lower than the projection of the surface of the magnetic layer (hereinafter, referred to as a "base part") does not come into contact with the servo write head or has a low contact frequency. The inventors have surmised that the spacing described above is a value which is an index of a distance between this base part and the servo write head. However, it is thought that, when a lubricant included in the magnetic layer forms a liquid film on the surface of the magnetic layer, the liquid film is present between the base part and the servo write head, and thus, the spacing becomes narrow by the thickness of the liquid film.

However, the lubricant is generally broadly divided into a fluid lubricant and a boundary lubricant. Fatty acid ester included in the magnetic layer of the magnetic tape is called as a component which can function as a fluid lubricant. It is considered that the fluid lubricant can protect the surface of the magnetic layer by forming a liquid film on a surface on the magnetic layer side. The inventors have surmised that the attached material which is attached to the servo write head and causes a deterioration of servo pattern forming ability of the servo write head is mainly a cut scrap of the surface of the magnetic layer generated due to the contact with the servo write head. With respect to this, the inventors have thought that, the presence of the liquid film formed by fatty acid ester on the surface of the magnetic layer causes the protection of the surface of the magnetic layer and the prevention of generation of cut scraps due to the cutting of the surface of the magnetic layer due to the contact with the servo write head. However, an excessive amount of fatty acid ester present on the surface of the magnetic layer causes sticking due to the formation of a meniscus (liquid cross-linking) between the surface of the magnetic layer and the servo write head due to fatty acid ester, and accordingly, the servo pattern forming ability of the servo write head is deteriorated.

In regards to this point, the inventors focused that fatty acid ester is a component having properties of volatilizing by vacuum heating, and a difference ($S_{after}-S_{before}$) of a spacing between a state after the vacuum heating (state in which a liquid film formed by fatty acid ester is volatilized and removed) and a state before the vacuum heating (state in which the liquid film formed by fatty acid ester is present) was used as an index of a thickness of the liquid film formed on the surface of the magnetic layer by fatty acid ester. The inventors have surmised that the presence of the liquid film formed on the surface of the magnetic layer by fatty acid ester so that the value of the difference is greater than 0 nm and equal to or smaller than 8.0 nm, causes the prevention of the occurrence of sticking and prevention of the generation of cutting scraps due to the cutting of the surface of the magnetic layer.

(2) A smaller value of the full width at half maximum of spacing distribution means that a variation in the values of the spacing measured on each part of the surface of the magnetic layer is small. As a result of the intensive studies, the inventors found that it is effective to increase uniformity of a contact state between the surface of the magnetic layer and the servo write head by increasing uniformity of a height of projection present on the surface of the magnetic layer and increasing uniformity of a thickness of a liquid film formed by fatty acid ester, in order to prevent sticking between the surface of the magnetic layer and the servo write head and occurrence of cutting of the surface of the magnetic layer, when the servo write head comes into contact with and slides on the surface of the magnetic layer.

In regards to this point, it is considered that the reason of the variation in values of the spacing is a variation in height of the projection of the surface of the magnetic layer and a variation in the thickness of the liquid film formed by fatty acid ester. The inventors have surmised that the spacing distribution $FWHM_{before}$ measured before the vacuum heating, that is, in a state where the liquid film formed on the surface of the magnetic layer by fatty acid ester is present, becomes great, as the variation in height of the projection and the variation in the thickness of the liquid film formed by fatty acid ester are great, and particularly, the spacing distribution $FWHM_{before}$ is greatly affected by the variation in the thickness of the liquid film formed by fatty acid ester. In contrast, the inventors have surmised that the spacing distribution $FWHM_{after}$ measured after the vacuum heating, that is, in a state where the liquid film formed by fatty acid ester is removed from the surface of the magnetic layer, becomes great, as the variation in height of the projection is great. That is, the inventors have surmised that small spacing distributions $FWHM_{before}$ and $FWHM_{after}$ mean a small variation in the thickness of the liquid film formed on the surface of the magnetic layer by fatty acid ester and a small variation in height of the projection. It was clear that it is possible to prevent the decrease of the output of the servo signals while continuously reading the servo pattern (continuously reproducing the servo signal) by the servo head, by increasing the uniformity of the height of the projection and the thickness of the liquid film formed by fatty acid ester so that the spacing distributions $FWHM_{before}$ and $FWHM_{after}$ are greater than 0 nm and equal to or smaller than 7.0 nm. The inventors have surmised that this is realized by preventing the deterioration of the servo pattern forming ability of the servo write head, by preventing the sticking between the surface of the magnetic layer and the servo write head and preventing the occurrence of cutting of the surface of the magnetic layer, when the servo write head comes into contact with and slide on the surface of the magnetic layer.

However, the above-mentioned description is merely a surmise of the inventors and the invention is not limited thereto.

Hereinafter, the magnetic tape will be described more specifically.

Spacing Distributions $FWHM_{before}$ and $FWHM_{after}$

Both of the spacing distribution $FWHM_{before}$ before the vacuum heating and the spacing distribution $FWHM_{after}$ after the vacuum heating which are measured in the magnetic tape are greater than 0 nm and equal to or smaller than 7.0 nm. The inventors have surmised that this point contributes the prevention of the output decrease of the servo signal of the timing-based servo system. From a viewpoint of further preventing the output decrease of the servo signal of the timing-based servo system, the $FWHM_{before}$ and the $FWHM_{after}$ are preferably equal to or smaller than 6.5 nm, more preferably equal to or smaller than 6.0 nm, even more preferably equal to or smaller than 5.5 nm, still more preferably equal to or smaller than 5.0 nm, and still even more preferably equal to or smaller than 4.5 nm. The $FWHM_{before}$ and the $FWHM_{after}$ can be, for example, equal to or greater than 0.5 nm, equal to or greater than 1.0 nm, equal to or greater than 2.0 nm, or equal to or greater than 3.0 nm. Meanwhile, from a viewpoint of preventing the output decrease of the servo signal in the timing-based servo system, it is preferable that the values thereof are small, and therefore, the values thereof may be smaller than the exemplified values.

The spacing distribution $FWHM_{before}$ before the vacuum heating can be decreased mainly by decreasing the variation in the thickness of the liquid film formed by fatty acid ester. An example of a specific method will be described later. Meanwhile, the spacing distribution $FWHM_{after}$ after the vacuum heating can be decreased by decreasing the variation in height of the projection of the surface of the magnetic layer. In order to perform the decreasing described above, it is preferable that a presence state of the powder component included in the magnetic layer, for example, non-magnetic filler, which will be described later specifically, in the magnetic layer is controlled. An example of a specific method will be described later.

Difference ($S_{after}-S_{before}$)

The difference ($S_{after}-S_{before}$) of the spacings before and after the vacuum heating measured in the magnetic tape is greater than 0 nm and equal to or smaller than 8.0 nm. From a viewpoint of further preventing the cutting of the surface of the magnetic layer coming into contact with the servo write head, the difference ($S_{after}-S_{before}$) is preferably equal to or greater than 0.1 nm, more preferably equal to or greater than 1.0 nm, even more preferably equal to or greater than 1.5 nm, and still more preferably equal to or greater than 2.0 nm. Meanwhile, from a viewpoint of further preventing the sticking between the servo write head and the surface of the magnetic layer, the difference ($S_{after}-S_{before}$) is preferably equal to or smaller than 7.5 nm, more preferably equal to or smaller than 7.0 nm, even more preferably equal to or smaller than 6.0 nm, still more preferably equal to or smaller than 5.0 nm, further more preferably equal to or smaller than 4.0 nm, still more preferably equal to or smaller than 3.5 nm, and still even more preferably equal to or smaller than 3.0 nm. The difference ($S_{after}-S_{before}$) can be controlled by the amount of fatty acid ester added to a magnetic layer forming composition. In addition, the difference ($S_{after}-S_{before}$) can also be controlled by the amount of fatty acid ester added to a non-magnetic layer forming composition. The non-magnetic layer can play a role of holding a lubricant and supplying the lubricant to the magnetic layer, and this is because fatty acid ester included in the non-magnetic layer may be moved to the magnetic layer and present in the surface of the magnetic layer.

Magnetic Layer

Fatty Acid Ester

The magnetic tape includes fatty acid ester in the magnetic layer. The fatty acid ester may be included alone as one type or two or more types thereof may be included. Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester of the magnetic layer forming composition is, for example, 0.1 to 10.0 parts by mass and is preferably 1.0 to 7.0 parts by mass with respect to 100.0 parts by mass of ferromagnetic powder. In a case of using two or more kinds of different fatty acid esters as the fatty acid ester, the content thereof is the total content thereof. In the invention and the specification, the same applies to content of other components, unless otherwise noted. In addition, in the invention and the specification, a given component may be used alone or used in combination of two or more kinds thereof, unless otherwise noted.

The content of fatty acid ester in the non-magnetic layer forming composition is, for example, 0 to 10.0 parts by mass and is preferably 0.1 to 8.0 parts by mass with respect to 100.0 parts by mass of non-magnetic powder.

Other Lubricants

In the magnetic tape, lubricants other than fatty acid ester may be arbitrarily included in the magnetic layer and/or the non-magnetic layer. As described above, the lubricant included in the non-magnetic layer may be moved to the magnetic layer and present in the surface of the magnetic layer. As the lubricant which may be arbitrarily included, fatty acid can be used. In addition, fatty acid amide and the like can also be used. Fatty acid ester is called a component which can function as a fluid lubricant, whereas fatty acid and fatty acid amide are called as a component which can function as a boundary lubricant. It is considered that the boundary lubricant is a lubricant which can be attached to a surface of powder (for example, ferromagnetic powder) and form a rigid lubricant film to decrease contact friction.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and examples thereof include lauric acid amide, myristic acid amide, palmitic acid amide, and stearic acid amide.

Regarding fatty acid and a derivative of fatty acid (amide and ester), a part derived from fatty acid of the fatty acid derivative preferably has a structure which is the same as or similar to that of fatty acid used in combination. As an example, in a case of using fatty acid and stearic acid, it is preferable to use stearic acid ester and/or stearic acid amide.

The content of fatty acid of the magnetic layer forming composition is, for example, 0 to 10.0 parts by mass, preferably 0.1 to 10.0 parts by mass, and more preferably 1.0 to 7.0 parts by mass, with respect to 100.0 parts by mass of the ferromagnetic powder. The content of fatty acid amide of the magnetic layer forming composition is, for example, 0 to 3.0 parts by mass, preferably 0 to 2.0 parts by mass, and more preferably 0 to 1.0 part by mass with respect to 100.0 parts by mass of the ferromagnetic powder.

In addition, the content of fatty acid of the non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid amide of the non-magnetic layer forming composition is, for example, 0 to 3.0 parts by mass and preferably 0 to 1.0 part by mass with respect to 100.0 parts by mass of the non-magnetic powder.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder (average plate diameter) is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size (average long axis length) of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, unless otherwise noted, an average particle sizes of various powders such as ferromagnetic powder is a value measured by the following method with a transmission electron microscope.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in Examples which will be described later is measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-48878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. The components other than the ferromagnetic powder of the magnetic layer are at least a binder and fatty acid ester, and one or more kinds of additives may be further arbitrarily included. A high filling percentage of the ferromagnetic powder in the magnetic layer is preferable from a viewpoint of improvement recording density.

Binder

The magnetic tape includes a binder in the magnetic layer together with the ferromagnetic powder and fatty acid ester. The binder is one or more kinds of resin. As the binder, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binder even in the non-magnetic layer and/or a back coating layer which will be described later. For the binder described above, description disclosed in paragraphs 0028 to 0031 of JP2010-24113A can be referred to. In addition, the binder may be a radiation curable resin such as an electron beam-curable resin. For the radiation curable resin, descriptions disclosed in paragraphs 0044 and 0045 of JP2011-48878A can be referred to.

In addition, a curing agent can be used together with a resin which can be used as the binder. The curing agent is a compound including at least one and preferably two or more crosslinking functional groups in one molecule. As the curing agent, polyisocyanate is suitable. For the details of polyisocyanate, descriptions disclosed in paragraphs 0124 and 0125 of JP2011-216149A can be referred to. The amount of the curing agent used can be, for example, 0 to 80.0 parts by mass with respect to 100.0 parts by mass of the binder, and is preferably 50.0 to 80.0 parts by mass, from a viewpoint of improvement of strength of each layer such as the magnetic layer.

Other Components

Additives can be added to the magnetic layer, if necessary. It is preferable that the magnetic layer includes one or more kinds of the non-magnetic filler. As the non-magnetic filler, a non-magnetic filler (hereinafter, also referred to as a "projection formation agent") which is added for controlling the projection of the surface of the magnetic layer and a non-magnetic filler which is added as an abrasive imparting abrasive properties to the surface of the magnetic layer are mainly used. The magnetic layer preferably includes at least the projection formation agent and more preferably includes the projection formation agent and the abrasive.

The non-magnetic filler which can function as the projection formation agent may be inorganic powder or organic powder, and is preferably inorganic powder. In addition, carbon black is also preferable. An average particle size (average primary particle size) of carbon black is preferably equal to or greater than 20 nm and more preferably equal to or greater than 30 nm. In addition, the average particle size of carbon black is preferably equal to or smaller than 150 nm and more preferably equal to or smaller than 100 nm.

Examples of the inorganic powder include powder of metal oxide, metal carbonate, metal sulfate, metal nitride, metal carbide, and metal sulfide, and specific examples thereof include powder of inorganic substances such as α-alumina, β-alumina, γ-alumina, θ-alumina, silicon oxide such as silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide, or composite inorganic substances including two or more kinds thereof. The inorganic oxide powder is more preferable and silicon oxide powder is even more preferable.

The non-magnetic filler which can function as a projection formation agent preferably has uniformity of the particle size, from a viewpoint of further improving electromagnetic conversion characteristics. From a viewpoint of availability of particles having high uniformity of the particle size, the non-magnetic filler is preferably colloidal particles. When the non-magnetic filler used in the formation of the magnetic layer can be available, it is possible to determine whether or not the non-magnetic filler included in the magnetic layer is colloidal particles, by evaluating whether or not such a non-magnetic filler has properties which are the properties of the colloidal particles described above. Alternatively, the determination can be also performed by evaluating whether or not the non-magnetic filler extracted from the magnetic layer has properties which are the properties of the colloidal particles described above. The extraction of the non-magnetic filler from the magnetic layer can be performed by the following method, for example.

1. 1 g of the magnetic layer is scraped off. The scraping can be performed, for example, by a razor blade.

2. A magnetic layer sample obtained by the scraping is put in a vessel such as an eggplant flask and 100 ml of tetrahydrofuran is added into this vessel. Examples of tetrahydrofuran include commercially available tetrahydrofuran to which a stabilizer is added and commercially available tetrahydrofuran to which a stabilizer is not added. Here, the commercially available tetrahydrofuran to which a stabilizer is not added is used. The same applies to tetrahydrofuran used in washing described hereinafter.

3. A circulation tube is attached to the vessel and heated in a water bath at a water temperature of 60° C. for 90 minutes. After filtering the content in the heated vessel with a filter paper, the solid content remaining on the filter paper is washed with tetrahydrofuran several times, and the washed solid content is moved to a vessel such as a beaker. A 4 N (4 mol/L) hydrochloric acid aqueous solution is added into this vessel and a residue remaining without being dissolved is extracted by filtering. As a filter, a filter having a hole diameter smaller than 0.05 μm is used. For example, a membrane filter used for chromatography analysis (for example, MF Millipore manufactured by Merck Millipore Corporation) can be used. The residue extracted by the filtering is washed with pure water several times and dried.

Ferromagnetic powder and organic matters (binder and the like) are dissolved by the operation described above, and a non-magnetic filler is collected as a residue.

By performing the steps described above, the non-magnetic filler can be extracted from the magnetic layer. In a case where a plurality of kinds of non-magnetic fillers are included in the non-magnetic filler extracted as described above, the plurality of kinds of non-magnetic fillers can be divided depending on differences of density.

As preferred colloidal particles, inorganic oxide colloidal particles can be used. As the inorganic oxide colloidal particles, colloidal particles of inorganic oxide described above can be used, and composite inorganic oxide colloidal particles such as $SiO_2.Al_2O_3$, $SiO_2.B_2O_3$, $TiO_2.CeO_2$, $SnO_2.Sb_2O_3$, $SiO_2.Al_2O_3.TiO_2$, and $TiO_2.CeO_2.SiO_2$. The inorganic oxide colloidal particles such as $SiO_2$, $Al_2O_3$, $TiO_2$, $ZrO_2$, and $Fe_2O_3$ are preferable and silica colloidal particles (colloidal silica) is particularly preferable. Meanwhile, typical colloidal particles have a hydrophilic surface, and thus, the colloidal particles are suitable for manufacturing a colloidal solution using water as a dispersion medium. For example, colloidal silica obtained by a general synthesis method has a surface covered with polarized oxygen atoms ($O^{2-}$), and thus, colloidal silica adsorbs water in water, forms a hydroxyl group, and is stabilized. However, these particles are hardly present in a colloidal state, in an organic solvent normally used in the magnetic layer forming composition. With respect to this, the colloidal particles of the invention and the specification are particles which are not precipitated but are dispersed to cause a colloidal dispersion, when 1 g thereof is added with respect to 100 mL of the organic solvent described above. Such colloidal particles can be prepared by a well-known method of hydrophobing the surface by surface treatment. For details of such hydrophobization treatment, descriptions disclosed in JP1993-269365A (JP-H05-269365A), JP1993-287213A (JP-H05-287213A), and JP2007-63117A are referred to.

As a manufacturing method of the silica colloidal particles (colloidal silica) which are preferred colloidal particles, two kinds of methods such as a water glass method and a sol-gel method are generally known. The water glass method is a method of using silica soda (sodium silicate, so-called water glass) as a raw material, performing ion exchange with respect to this to generate an active silica, and causing particle growth. Meanwhile, the sol-gel method is a method of using tetraalkoxysilane as a raw material, and performing hydrolysis under a basic catalyst and causing particle growth at the same time. In a case of using the silica colloidal particles as the non-magnetic filler, the silica colloidal particles may be manufactured by any manufacturing method described above.

An average particle size of the non-magnetic filler which may function as a projection formation agent is preferably in a range of 50 to 200 nm, and more preferably in a range of 50 to 150 nm.

The content of the non-magnetic filler which may function as a projection formation agent in the magnetic layer is preferably 1.0 to 4.0 parts by mass and more preferably 1.5 to 3.5 parts by mass with respect to 100.0 parts by mass of the ferromagnetic powder.

Meanwhile, the non-magnetic filler which may function as an abrasive may be inorganic powder or organic powder, and the inorganic powder is preferable. Examples of the non-magnetic powder which may function as an abrasive include powders of alumina ($Al_2O_3$), silicon carbide, boron carbide ($B_4C$), $SiO_2$, TiC chromium oxide ($Cr_2O_3$), cerium oxide, zirconium oxide ($ZrO_2$), iron oxide, diamond, and the like which are materials normally used as the abrasive of the magnetic layer, and among these, alumina powder such as α-alumina and silicon carbide powder are preferable. The content of the non-magnetic filler which may function as an abrasive in the magnetic layer is preferably in a range of 1.0 to 20.0 parts by mass, more preferably in a range of 3.0 to 15.0 parts by mass, and even more preferably in a range of 4.0 to 10.0 parts by mass with respect to 100.0 parts by mass of the ferromagnetic powder. The average particle size of the non-magnetic filler which may function as an abrasive is, for example, in a range of 30 to 300 nm and preferably in a range of 50 to 200 nm.

An arbitrary amount of one or more kinds of various additives such as a dispersing agent, a dispersing assistant, an antifungal agent, an antibacterial agent, and an antioxidant may be further added to the magnetic layer. As the additives, commercially available products can be suitably selectively used according to desired properties.

The magnetic layer described above is provided on the non-magnetic layer formed on the non-magnetic support. The details of the non-magnetic layer and the non-magnetic support will be described later.

Non-Magnetic Layer

The magnetic tape includes a non-magnetic layer including non-magnetic powder and a binder between the non-magnetic support and the magnetic layer. The non-magnetic powder used in the non-magnetic layer may be inorganic powder or organic powder. In addition, carbon black and the like can be used. Examples of the inorganic powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

The non-magnetic layer of the invention also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kAm (100 Oe), or a layer having a residual magnetic flux density equal to or smaller than 10 mT and coercivity equal to or smaller than 7.96 kAm (100 Oe). It is preferable that the non-magnetic layer does not have a residual magnetic flux density and coercivity.

Back Coating Layer

The magnetic tape can also include a back coating layer including non-magnetic powder and a binder on a side of the non-magnetic support opposite to the side including the magnetic layer. The back coating layer preferably includes any one or both of carbon black and inorganic powder. In regards to the binder included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support will be described. As the non-magnetic support (also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Various Thickness

In the magnetic tape, the total thickness of the magnetic layer and the non-magnetic layer is equal to or smaller than 0.60 µm and preferably equal to or smaller than 0.50 µm, from a viewpoint of thinning the magnetic tape. In addition, the total thickness of the magnetic layer and the non-magnetic layer is, for example, equal to or greater than 0.10 µm or equal to or greater than 0.20 µm.

In the thicknesses of the non-magnetic support and each layer of the magnetic tape, the thickness of the non-magnetic support is preferably 3.00 to 4.50 µm.

A thickness of the magnetic layer can be optimized in accordance with saturation magnetization quantity of the magnetic head used, a head gap length, or a band of a recording signal. The thickness of the magnetic layer is normally 0.01 µm to 0.15 µm, and is preferably 0.02 µm to 0.12 µm and more preferably 0.03 µm to 0.10 µm, from a viewpoint of realizing recording at high density. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.10 to 0.55 µm and is preferably 0.10 to 0.50 µm.

A thickness of the back coating layer is preferably equal to or smaller than 0.90 µm and even more preferably in a range of 0.10 to 0.70 µm.

In addition, the total thickness of the magnetic tape is preferably equal to or smaller than 6.00 µm, more preferably equal to or smaller than 5.70 µm, and even more preferably equal to or smaller than 5.50 µm, from a viewpoint of improving recording capacity for 1 magnetic tape cartridge. Meanwhile, the total thickness of the magnetic tape is preferably equal to or greater than 1.00 µm, from a viewpoint of availability (handling properties) of the magnetic tape.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Measurement Method

Manufacturing of Magnetic Tape in which Servo Pattern is Formed

Preparation of Each Layer Forming Composition

Each composition for forming the magnetic layer, the non-magnetic layer, or the back coating layer which is arbitrarily provided normally includes a solvent, together with various components described above. As the solvent, organic solvents generally used for manufacturing a coating type magnetic recording medium can be used. Among those, from a viewpoint of solubility of the binder normally used in the coating type magnetic recording medium, the each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of the each layer forming composition is not particularly limited, and can be set to be the same as that of the each layer forming composition of a typical coating type magnetic recording medium. The steps of preparing the composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, the binder may be separately added in the kneading step, the dispersing step, and a mixing step for viscosity adjustment after the dispersion. In the manufacturing step of the magnetic tape, a well-known manufacturing technology of the related art can be used as a part of the step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are suitable. These dispersion beads are preferably used by optimizing a bead diameter and a filling percentage. As a dispersion device, a well-known dispersion device can be used.

Coating Step

The magnetic layer can be formed by performing multi-layer coating of the magnetic layer forming composition with the non-magnetic layer forming composition in order or at the same time. The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to.

One Aspect of Preferred Manufacturing Method

As a preferred manufacturing method, a manufacturing method of applying vibration to the magnetic layer can be used, in order to improve uniformity of the thickness of the liquid film formed on the surface of the magnetic layer by fatty acid ester. The inventors have surmised that, by adding vibration, the liquid film formed on the surface of the magnetic layer by fatty acid ester flows and the uniformity of the thickness of the liquid film is improved.

That is, the magnetic tape can be manufactured by a manufacturing method of forming the magnetic layer by applying and drying the magnetic layer forming composition including ferromagnetic powder, a binder, and fatty acid ester with the non-magnetic layer forming composition in order or at the same time, and applying vibration to the formed magnetic layer. The manufacturing method is identical to the typical manufacturing method of the magnetic tape, except for applying vibration to the magnetic layer, and the details thereof are as described above.

Means for applying vibration are not particularly limited. For example, the vibration can be applied to the magnetic layer, by bringing the surface of the non-magnetic support, provided with the magnetic layer formed, on a side opposite to the magnetic layer to come into contact with a vibration imparting unit. The non-magnetic support, provided with the magnetic layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the magnetic layer by a vibration frequency, and strength of the ultrasonic vibrator, and/or the contact time with the vibration imparting unit. For example, the contact time can be adjusted by a running speed of the non-magnetic support, provided with the magnetic layer formed, while coming into contact with the vibration imparting unit. The vibration imparting conditions are not particularly limited, and may be set so as to control the spacing distribution, particularly, the spacing distribution $FWHM_{before}$ before vacuum heating. In order to set the vibration imparting conditions, a preliminary experiment can be performed before the actual manufacturing, and the conditions can be optimized.

In addition, the spacing distribution $FWHM_{after}$ after the vacuum heating tends to be decreased, when the dispersion conditions of the magnetic layer forming composition are reinforced (for example, the number of times of the dispersion is increased, the dispersion time is extended, and the like), and/or the filtering conditions are reinforced (for example, a filter having a small hole diameter is used as a filter used in the filtering, the number of times of the filtering is increased, and the like). The inventors have surmised that this is because the uniformity of the height of the projection present on the surface of the magnetic layer is improved, by improving dispersibility and/or the uniformity of the particle size of the particulate matter included in the magnetic layer forming composition, particularly, the non-magnetic filler which may function as the projection formation agent described above. A preliminary experiment can be performed before the actual manufacturing, and the dispersion conditions and/or the filtering conditions can be optimized.

In addition, in the magnetic tape including the magnetic layer including carbon black as the non-magnetic filler, it is effect to use the dispersing agent for improving dispersibility of the carbon black as a magnetic layer component, in order to decrease the spacing distribution $FWHM_{after}$ after the vacuum heating. For example, organic tertiary amine can be used as a dispersing agent of carbon black. For details of the organic tertiary amine, descriptions disclosed in paragraphs 0011 to 0018 and 0021 of JP2013-049832A can be referred to. The organic tertiary amine is more preferably trialkylamine. An alkyl group included in trialkylamine is preferably an alkyl group having 1 to 18 carbon atoms. Three alkyl groups included in trialkylamine may be the same as each other or different from each other. For details of the alkyl group, descriptions disclosed in paragraphs 0015 to 0016 of JP2013-049832A can be referred to. As trialkylamine, tri-octylamine is particularly preferable.

Hereinabove, an aspect of the preferred manufacturing method has been described. However, the magnetic tape according to one aspect of the invention is not limited to a magnetic tape manufactured by the manufacturing method described above.

Formation of Servo Pattern

The magnetic tape includes a timing-based servo pattern in the magnetic layer. FIG. 1 shows a disposition example of a region (servo band) in which the timing-based servo pattern is formed and a region (data band) interposed between two servo bands. FIG. 2 shows a disposition example of the timing-based servo patterns. Here, the disposition example shown in each drawing is merely an example, and the servo pattern, the servo bands, and the data bands may be disposed in the disposition according to a system of the magnetic tape device (drive). In addition, for the shape and the disposition of the timing-based servo pattern, a well-known technology such as disposition examples shown in FIG. 4, FIG. 5, FIG. 6, FIG. 9, FIG. 17, and FIG. 20 of U.S. Pat. No. 5,689,384A can be applied without any limitation, for example.

The servo pattern can be formed by magnetizing a specific region of the magnetic layer by a servo write head mounted on a servo writer. A region to be magnetized by the servo write head (position where the servo pattern is formed) is determined by standards. As the servo writer, a commercially available servo writer or a servo writer having a well-known configuration can be used. For the configuration of the servo writer, well-known technologies such as technologies disclosed in JP2011-175687A, U.S. Pat. No. 5,689,384A, and U.S. Pat. No. 6,542,325B can be referred to without any limitation.

The magnetic tape according to one aspect of the invention described above is a magnetic tape in which the total thickness of a non-magnetic layer and a magnetic layer is equal to or smaller than 0.60 m and servo patterns are formed in the magnetic layer, and can prevent the output decrease of the servo signal of the timing-based servo system.

Magnetic Tape Device

One aspect of the invention relates to a magnetic tape device including the magnetic tape, a magnetic head, and a servo head.

The details of the magnetic tape mounted on the magnetic tape device are as described above. The magnetic tape is generally accommodated in a magnetic tape cartridge and the magnetic tape cartridge is attached to the magnetic tape device. Details of the structure of the magnetic tape cartridge are well known. The magnetic tape cartridge is mounted on the magnetic tape device. The magnetic tape includes timing-based servo patterns. Accordingly, a magnetic signal is recorded on the data band by the magnetic head to form a data track, and/or, when reproducing the recorded signal, a head tracking of a timing-based servo type can be performed based on the read servo pattern, while reading the servo pattern by the servo head. Here, when the output of the servo signal is decreased, the head positioning accuracy may be decreased, as described above. With respect to this, according to the magnetic tape, it is possible to prevent the output decrease of the servo signal, and accordingly, it is possible to cause the magnetic head to follow the data track at a high accuracy in the timing-based servo system.

As the magnetic head mounted on the magnetic tape device, a well-known magnetic head which can perform the recording and/or reproducing of the magnetic signal with respect to the magnetic tape can be used. A recording head and a reproduction head may be one magnetic head or may be separated magnetic heads. As the servo head, a well-known servo head which can read the timing-based servo pattern of the magnetic tape can be used. At least one or two or more servo heads may be included in the magnetic tape device.

For details of the head tracking of the timing-based servo system, for example, well-known technologies such as technologies disclosed in U.S. Pat. No. 5,689,384A, U.S. Pat. No. 6,542,325B, and U.S. Pat. No. 7,876,521B can be used without any limitation.

A commercially available magnetic tape device generally includes a magnetic head and a servo head in accordance to a standard. In addition, a commercially available magnetic tape device generally has a servo controlling mechanism for realizing head tracking of the timing-based servo system in accordance to a standard. The magnetic tape device according to one aspect of the invention can be configured by incorporating the magnetic tape according to one aspect of the invention to a commercially available magnetic tape device.

EXAMPLES

Hereinafter, the invention will be described with reference to Examples. However, the invention is not limited to aspects shown in the Examples. "Parts" in the following description means "parts by mass", unless otherwise noted.

Example 1

Magnetic Layer Forming Composition
Magnetic Solution
Ferromagnetic hexagonal ferrite powder: 100.0 parts
(coercivity Hec: 2100 Oe (168 kA/m), average particle size: 25 nm)
Sulfonic acid group-containing polyurethane resin: 15.0 parts
Cyclohexanone: 150.0 parts
Methyl ethyl ketone: 150.0 parts
Abrasive Liquid
α-alumina (average particle size of 110 nm): 9.0 parts
Vinyl chloride copolymer: (MR110 manufactured by Zeon Corporation): 0.7 parts
Cyclohexanone: 20.0 parts
Silica Sol
Colloidal silica prepared by a sol-gel method (average particle size: 120 nm): 3.5 parts
Methyl ethyl ketone: 8.2 parts
Other Components
Butyl stearate: 1.0 part
Stearic acid: 1.0 part
Polyisocyanate (CORONATE manufactured by Nippon Polyurethane Industry): 2.5 parts
Finishing Additive Solvent
Cyclohexanone: 180.0 parts
Methyl ethyl ketone: 180.0 parts
Non-Magnetic Layer Forming Composition
Non-magnetic inorganic powder (α-iron oxide): 80.0 parts
(average particle size: 0.15 μm, average acicular ratio: 7, Brunauer-Emmett-Teller (BET) specific surface area: 52 $m^2/g$)
Carbon black (average particle size of 20 nm): 20.0 parts
Electron beam-curable vinyl chloride copolymer: 13.0 parts
Electron beam-curable polyurethane resin: 6.0 parts
Phenylphosphonic acid: 3.0 parts
Cyclohexanone: 140.0 parts
Methyl ethyl ketone: 170.0 parts
Butyl stearate: see Table 1
Stearic acid: see Table 1
Back Coating Layer Forming Composition
Non-magnetic inorganic powder (α-iron oxide): 80.0 parts
(average particle size: 0.15 μm, average acicular ratio: 7, BET specific surface area: 52 $m^2/g$)
Carbon black (average particle size of 20 nm): 20.0 parts
Carbon black (average particle size of 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Nippon Polyurethane Industry): 5.0 parts
Methyl ethyl ketone: 400.0 parts
Preparation of Each Layer Forming Composition
The magnetic layer forming composition was prepared by the following method.

The magnetic solution was kneaded and diluted by an open kneader, and subjected to a dispersing process of 12 passes, with a transverse beads mill dispersion device and zirconia ($ZrO_2$) beads (hereinafter, referred to as "Zr beads") having a bead diameter of 0.5 mm, by setting a bead filling percentage as 80 volume %, a circumferential speed of rotor tip as 10 m/sec, and a retention time for 1 pass as 2 minutes.

After mixing the components described above, the abrasive solution was put in a vertical sand mill dispersion device together with Zr beads having a bead diameter of 1 mm, the bead volume/(abrasive solution volume+bead volume) was adjusted to be 60%, the sand mill dispersing process was performed for 180 minutes, a solution after the process is extracted, and an ultrasonic dispersion filtering process was performed with a flow-type ultrasonic dispersion filtering device.

The magnetic solution, the silica sol, the abrasive solution, other components, and the finishing additive solvent are introduced into a dissolver stirring device, and were stirred at a circumferential speed of 10 m/sec for 30 minutes. After that, the treatment is performed with a flow-type ultrasonic dispersion device at a flow rate of 7.5 kg/min for the number of times of the passes shown Table 1, and then, a magnetic layer forming composition was prepared by performing filtering with a filter having a hole diameter shown in Table 1, for the number of times of the passes shown Table 1.

The non-magnetic layer forming composition was prepared by the following method. Each component excluding a lubricant (butyl stearate and stearic acid) was kneaded with an open kneader and diluted, and then, was dispersed by using a horizontal bead mill dispersion device. After that, the lubricant (butyl stearate and stearic acid) was added thereto, and stirred and mixed with a dissolver stirring device, to prepare a non-magnetic layer forming composition.

The back coating layer forming composition was prepared by the following method. Each component excluding the lubricant (stearic acid), polyisocyanate, and methyl ethyl ketone (400.0 parts) was kneaded with an open kneader and diluted, and then, was dispersed by using a horizontal bead mill dispersion device. After that, the lubricant (stearic acid), polyisocyanate, and methyl ethyl ketone (400.0 parts) were added thereto, and stirred and mixed with a dissolver stirring device, to prepare a back coating layer forming composition.

Manufacturing of Magnetic Tape

The non-magnetic layer forming composition was applied onto a polyethylene naphthalate support having a thickness shown in Table 1 and dried so that the thickness after the drying becomes the thickness shown in Table 1, and then, an electron beam was emitted with an energy of 40 kGy at an acceleration voltage of 125 kV. The magnetic layer forming composition was applied thereto and dried so that the thickness after the drying becomes the thickness shown in Table 1, to form a coating layer of the magnetic layer forming composition.

Figure 3:
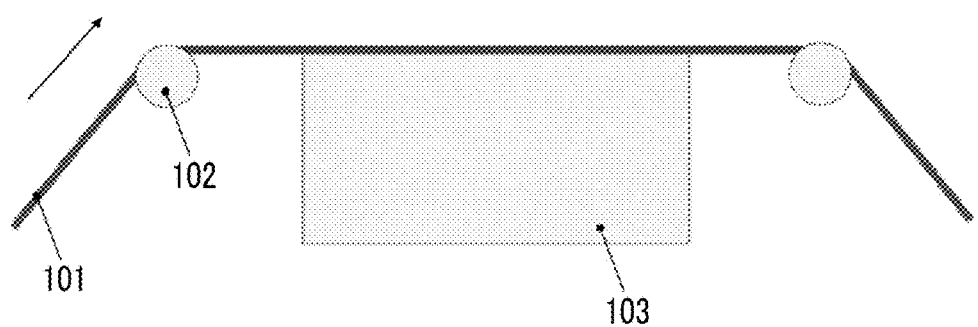
FIG. 3 is a schematic configuration diagram of a vibration imparting device used in the Examples.

After that, the support, provided with the coating layer formed, was installed in a vibration imparting device shown in FIG. 3 so that the surface thereof on a side opposite to the surface where the coating layer is formed comes into contact with the vibration imparting unit, and the support (in FIG. 3, reference numeral 101), provided with the coating layer formed, was transported at a transportation speed of 0.5 m/sec, to apply vibration to the coating layer. In FIG. 3, a reference numeral 102 denotes a guide roller (a reference numeral 102 denotes one of two guide rollers), a reference numeral 103 denotes the vibration imparting device (vibration imparting unit including the ultrasonic vibrator), and an arrow denotes a transportation direction. The time from the start of the contact of the arbitrary portion of the support, provided with the coating layer formed, with the vibration imparting unit until the end of the contact is shown in Table 1 as the vibration imparting time. The vibration imparting unit used includes an ultrasonic vibrator therein. The vibration was imparted by setting a vibration frequency and the intensity of the ultrasonic vibrator as values shown in Table 1.

After that, the back coating layer forming composition was applied onto the surface of the support on a side opposite to the surface where the non-magnetic layer and the magnetic layer are formed, and dried so that the thickness after the drying becomes thickness shown in Table 1. After that, the surface smoothing treatment (calender process) was performed with a calender roll configured of only a metal roll, at a calender process speed of 80 m/min, linear pressure of 300 kg/cm (294 kN/m), and a surface temperature of a calender roll of 95° C.

Then, the thermal treatment was performed in the environment of the atmosphere temperature of 70° C. for 36 hours. After the thermal treatment, the slitting was performed so as to have a width of ½ inches (0.0127 meters), and the surface of the magnetic layer was cleaned with a tape cleaning device in which a nonwoven fabric and a razor blade are attached to a device including a sending and winding devices of the slit so as to press the surface of the magnetic layer.

By doing so, the magnetic tape was manufactured.

Formation of Timing-Based Servo Pattern

In a state where the magnetic layer of the manufactured magnetic tape was demagnetized, servo patterns having disposition and shapes according to the LTO Ultrium format were formed on the magnetic layer by using a servo write head mounted on a servo testing machine. Accordingly, a magnetic tape including data bands, servo bands, and guide bands in the disposition according to the LTO Ultrium format in the magnetic layer, and including servo patterns having the disposition and the shape according to the LTO Ultrium format on the servo band is obtained. In this magnetic tape, total 5,000,000 servo frames of servo frames including the A burst, B burst, C burst, and D burst are formed in the disposition shown in FIG. 2. The servo testing machine includes a servo write head and a servo head. This servo testing machine was also used in the evaluation which will be described later.

Examples 2 to 5 and Comparative Examples 1 to 9

A magnetic tape was manufactured in the same manner as in Example 1, except for changing the list of the non-magnetic layer forming composition and/or the manufacturing conditions shown in Table 1. The vibration imparting time was adjusted by changing the transportation speed of the support, provided with the coating layer formed, of the magnetic layer forming composition.

In the magnetic tape of Comparative Example 7 and the magnetic tape of Comparative Example 8, the following evaluation was performed regarding the magnetic tape in a state before forming a servo pattern. This is because of the following reasons.

When the servo pattern was formed in the magnetic tape of Comparative Example 7 by the same method as in Example 1, the running of the magnetic tape was difficult due to the occurrence of sticking between the servo write head and the surface of the magnetic layer, while the surface of the magnetic layer of the running magnetic tape comes into contact with and slide on the servo write head. Accordingly, the formation of the servo pattern was stopped.

In addition, when the servo pattern was formed in the magnetic tape of Comparative Example 8 by the same method as in Example 1, the running of the magnetic tape was difficult due to an effect of the attached material attached to the servo write head, while the surface of the magnetic layer of the running magnetic tape comes into contact with and slide on the servo write head. Accordingly, the formation of the servo pattern was stopped. After the formation of the servo pattern was stopped, the surface of the magnetic layer of the magnetic tape of Comparative Example 8 was observed with an optical microscope, and scratches were confirmed. Therefore, the attached materials may be cut scrap generated due to the cutting of the surface of the magnetic layer due to the contact with the servo write head.

The thickness of each layer and the non-magnetic support of the magnetic tape manufactured was acquired by the following method. It was confirmed that the thickness of each layer and the non-magnetic support formed is the thickness shown in Table 1.

The cross section of the magnetic tape in a thickness direction was exposed by an ion beam, and then, the cross section observation of the exposed cross section was performed with a scanning electron microscope. Various thicknesses were acquired as an arithmetical mean of thicknesses acquired at two positions in the thickness direction, in the cross section observation.

Physical Properties Evaluation Method of Magnetic Tape

1. Spacing Distributions $FWHM_{before}$ and $FWHM_{after}$ Before and after Vacuum Heating The spacing distributions $FWHM_{before}$ and $FWHM_{after}$ before and after vacuum heating were acquired by the following method by using a tape spacing analyzer (TSA) (manufactured by MicroPhysics, Inc.).

In a state where a glass sheet included in the TSA was disposed on the surface of the magnetic layer of the magnetic tape, a hemisphere was pressed against the surface of the back coating layer of the magnetic tape at pressure of $5.05 \times 10^4$ N/m (0.5 atm) by using a hemisphere made of urethane included in the TSA as a pressing member. In this state, a given region (150,000 to 200,000 $\mu m^2$) of the surface of the magnetic layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the magnetic layer of the magnetic tape was acquired, and the full width at half maximum of spacing distribution was full width at half maximum, when this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

2. Difference ($S_{after} - S_{before}$)

The difference ($S_{after} - S_{before}$) was a value obtained by subtracting a mode of the histogram before the vacuum heating from a mode of the histogram after the vacuum heating obtained in the section 1.

Performance Evaluation Method of Magnetic Tape

Output Decreased Amount of Servo Signal

The magnetic tape in which the timing-based servo pattern is formed was attached to a servo testing machine. In the servo testing machine, the servo patterns were sequentially read (servo signals were reproduced) by the servo head from the servo pattern of the first servo frame formed in the magnetic tape to the servo pattern of the final 5,000,000-th servo frame, while bringing the surface of the magnetic layer of the running magnetic tape to come into contact with and slide on the servo head. An arithmetical mean of the signal output obtained in the first to 100-th servo frames was set as A, an arithmetical mean of the signal output obtained in the 4,999,900-th to 5,000,000-th servo frames was set as B, and the output decreased amount of the servo signal (unit: %) was calculated with an expression of "[(B−A)/A]×100".

The results described above are shown in Table 1.

TABLE 1

| | | | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Non-magnetic layer forming composition | Butyl stearate | Content | Part | 4.0 | 4.0 | 4.0 | 4.0 | 8.0 | 4.0 | 10.0 |
| | Stearic acid | Content | Part | 1.0 | 1.0 | 1.0 | 1.0 | 1.0 | 1.0 | 1.0 |
| Manufacturing conditions | Ultrasonic vibration imparting conditions | Imparting time | Second | None | None | None | None | None | 0.5 | 0.5 |
| | | Frequency | kHz | | | | | | 30 | 30 |
| | | Intensity | W | | | | | | 100 | 100 |
| | Magnetic layer forming composition preparation conditions | Number of times of passes of flow-type ultrasonic dispersion device | Times | 2 | 2 | 2 | 2 | 2 | 1 | 2 |
| | | Number of times of filtering | Times | 1 | 1 | 1 | 1 | 1 | 1 | 1 |
| | | Filter hole diameter | μm | 1.0 | 1.0 | 1.0 | 1.0 | 1.0 | 1.0 | 1.0 |
| Physical properties | Magnetic layer | Thickness | μm | 0.10 | 0.10 | 0.10 | 0.10 | 0.10 | 0.10 | 0.10 |
| | Non-magnetic layer | Thickness | μm | 1.00 | 0.70 | 0.50 | 0.10 | 0.50 | 0.50 | 0.50 |
| | Non-magnetic support | Thickness | μm | 4.30 | 4.30 | 4.30 | 4.30 | 4.30 | 4.30 | 4.30 |
| | Back coating layer | Thickness | μm | 0.60 | 0.60 | 0.60 | 0.60 | 0.60 | 0.60 | 0.60 |
| | Non-magnetic layer + magnetic layer | Total thickness | μm | 1.10 | 0.80 | 0.60 | 0.20 | 0.60 | 0.60 | 0.60 |

TABLE 1-continued

|  |  | Unit | | | | | | | |
|---|---|---|---|---|---|---|---|---|---|
|  | S$_{after}$-S$_{before}$ | nm | 6.0 | 4.2 | 3.2 | 1.0 | 6.0 | 3.1 | 8.2 |
|  | FWHMbefore | nm | 8.7 | 8.8 | 8.5 | 8.6 | 8.6 | 6.8 | 6.9 |
|  | FWHMafter | nm | 6.9 | 6.8 | 7.0 | 7.0 | 6.8 | 7.5 | 6.9 |
| Performance | Servo signal output decrease | % | −0.2 | −0.9 | −6.3 | −16.0 | −4.5 | −6.0 | — |

|  |  |  | Unit | Comparative Example 8 | Comparative Example 9 | Example 1 | Example 2 | Example 3 | Example 4 | Example 5 |
|---|---|---|---|---|---|---|---|---|---|---|
| Non-magnetic layer forming composition | Butyl stearate | Content | Part | 0.0 | 4.0 | 4.0 | 4.0 | 2.0 | 8.0 | 4.0 |
|  | Stearic acid | Content | Part | 1.0 | 2.0 | 1.0 | 1.0 | 1.0 | 1.0 | 1.0 |
| Manufacturing conditions | Ultrasonic vibration imparting conditions | Imparting time | Second | 0.5 | None | 0.5 | 3.0 | 0.5 | 0.5 | 3.0 |
|  |  | Frequency | kHz | 30 |  | 30 | 30 | 30 | 30 | 30 |
|  |  | Intensity | W | 100 |  | 100 | 100 | 100 | 100 | 100 |
|  | Magnetic layer forming composition preparation conditions | Number of times of passes of flow-type ultrasonic dispersion device | Times | 2 | 2 | 2 | 30 | 2 | 2 | 30 |
|  |  | Number of times of filtering | Times | 1 | 1 | 1 | 5 | 1 | 1 | 5 |
|  |  | Filter hole diameter | μm | 1.0 | 1.0 | 1.0 | 0.5 | 1.0 | 1.0 | 0.5 |
| Physical properties | Magnetic layer | Thickness | μm | 0.10 | 0.10 | 0.10 | 0.10 | 0.10 | 0.10 | 0.10 |
|  | Non-magnetic layer | Thickness | μm | 0.50 | 0.50 | 0.50 | 0.50 | 0.50 | 0.50 | 0.10 |
|  | Non-magnetic support | Thickness | μm | 4.30 | 4.30 | 4.30 | 4.30 | 4.30 | 4.30 | 4.30 |
|  | Back coating layer | Thickness | μm | 0.60 | 0.60 | 0.60 | 0.60 | 0.60 | 0.60 | 0.60 |
|  | Non-magnetic layer + magnetic layer | Total thickness | μm | 0.60 | 0.60 | 0.60 | 0.60 | 0.60 | 0.60 | 0.20 |
|  | S$_{after}$-S$_{before}$ |  | nm | 0 | 3.2 | 3.1 | 2.9 | 1.5 | 6.2 | 3.1 |
|  | FWHMbefore |  | nm | 6.8 | 8.5 | 6.8 | 4.1 | 7.0 | 4.1 | 3.9 |
|  | FWHMafter |  | nm | 7.0 | 7.0 | 6.9 | 4.0 | 6.9 | 3.9 | 4.0 |
| Performance | Servo signal output decrease |  | % | — | −6.2 | −0.3 | 0.0 | −0.8 | −0.2 | −0.1 |

With the comparison of Comparative Examples, it was confirmed that, in the case where the total thickness of the non-magnetic layer and the magnetic layer is equal to or smaller than 0.60 μm (Comparative Examples 3 to 6 and 9), the output of the servo signal is significantly decreased, compared to the case where the total thickness of the non-magnetic layer and the magnetic layer exceeds 0.60 μm (Comparative Examples 1 and 2).

With respect to this, in the magnetic tape of Examples 1 to 5, the total thickness of the non-magnetic layer and the magnetic layer is equal to or smaller than 0.60 μm, however, the output decrease of the servo signal was prevented, compared to that of the magnetic tape of Comparative Examples 3 to 6 and 9.

An aspect of the invention can be effective in technical fields of magnetic tapes for high-density recording.

What is claimed is:

1. A magnetic tape comprising:
a non-magnetic support;
a non-magnetic layer including non-magnetic powder and a binder on the non-magnetic support; and
a magnetic layer including ferromagnetic powder and a binder on the non-magnetic layer,
wherein the total thickness of the non-magnetic layer and the magnetic layer is equal to or smaller than 0.60 μm,
the magnetic layer includes a timing-based servo pattern,
the magnetic layer includes fatty acid ester,
a full width at half maximum of spacing distribution measured by optical interferometry regarding the surface of the magnetic layer before performing vacuum heating with respect to the magnetic tape is greater than 0 nm and equal to or smaller than 7.0 nm,
a full width at half maximum of spacing distribution measured by optical interferometry regarding the surface of the magnetic layer after performing the vacuum heating with respect to the magnetic tape is greater than 0 nm and equal to or smaller than 7.0 nm, and
a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

2. The magnetic tape according to claim 1,
wherein the total thickness of the non-magnetic layer and the magnetic layer is 0.20 μm to 0.60 μm.

3. The magnetic tape according to claim 1,
wherein the difference $S_{after}-S_{before}$ is greater than 0 nm and equal to or smaller than 7.0 nm.

4. The magnetic tape according to claim 1,
wherein the difference $S_{after}-S_{before}$ is 2.0 nm to 7.0 nm.

5. The magnetic tape according to claim 1,
wherein the full width at half maximum of spacing distribution measured by optical interferometry regarding the surface of the magnetic layer before performing vacuum heating with respect to the magnetic tape is greater than 0 nm and equal to or smaller than 5.0 nm.

6. The magnetic tape according to claim 1, wherein the full width at half maximum of spacing distribution measured by optical interferometry regarding the surface of the magnetic layer after performing the vacuum heating with respect to the magnetic tape is greater than 0 nm and equal to or smaller than 5.0 nm.

7. The magnetic tape according to claim 1, wherein the magnetic layer includes a non-magnetic filler.

8. The magnetic tape according to claim 7, wherein the non-magnetic filler is colloidal particles.

9. The magnetic tape according to claim 8, wherein colloidal particles are silica colloidal particles.

10. A magnetic tape device comprising:
a magnetic tape;
a magnetic head; and
a servo head, wherein
the magnetic tape is a magnetic tape comprising:
a non-magnetic support;
a non-magnetic layer including non-magnetic powder and a binder on the non-magnetic support; and
a magnetic layer including ferromagnetic powder and a binder on the non-magnetic layer,
wherein the total thickness of the non-magnetic layer and the magnetic layer is equal to or smaller than 0.60 μm,
the magnetic layer includes a timing-based servo pattern,
the magnetic layer includes fatty acid ester,
a full width at half maximum of spacing distribution measured by optical interferometry regarding the surface of the magnetic layer before performing vacuum heating with respect to the magnetic tape is greater than 0 nm and equal to or smaller than 7.0 nm,
a full width at half maximum of spacing distribution measured by optical interferometry regarding the surface of the magnetic layer after performing the vacuum heating with respect to the magnetic tape is greater than 0 nm and equal to or smaller than 7.0 nm, and
a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

11. The magnetic tape device according to claim 10, wherein the total thickness of the non-magnetic layer and the magnetic layer of the magnetic tape is 0.20 μm to 0.60 μm.

12. The magnetic tape device according to claim 10, wherein the difference $S_{after}-S_{before}$ is greater than 0 nm and equal to or smaller than 7.0 nm.

13. The magnetic tape device according to claim 10, wherein the difference $S_{after}-S_{before}$ is 2.0 nm to 7.0 nm.

14. The magnetic tape device according to claim 10, wherein the full width at half maximum of spacing distribution measured by optical interferometry regarding the surface of the magnetic layer before performing vacuum heating with respect to the magnetic tape is greater than 0 nm and equal to or smaller than 5.0 nm.

15. The magnetic tape device according to claim 10, wherein the full width at half maximum of spacing distribution measured by optical interferometry regarding the surface of the magnetic layer after performing the vacuum heating with respect to the magnetic tape is greater than 0 nm and equal to or smaller than 5.0 nm.

16. The magnetic tape device according to claim 10, wherein the magnetic layer includes a non-magnetic filler.

17. The magnetic tape device according to claim 16, wherein the non-magnetic filler is colloidal particles.

18. The magnetic tape device according to claim 17, wherein colloidal particles are silica colloidal particles.

* * * * *